(12) United States Patent
Zeng

(10) Patent No.: US 9,726,543 B2
(45) Date of Patent: Aug. 8, 2017

(54) APPARATUS AND METHOD FOR VALIDATING LEAK SURVEY RESULTS

(71) Applicant: Providence Photonics, LLC, Baton Rouge, LA (US)

(72) Inventor: Yousheng Zeng, Baton Rouge, LA (US)

(73) Assignee: PROVIDENCE PHOTONICS, LLC, Baton Rouge, LA (US)

( * ) Notice: Subject to any disclaimer, the term of this patent is extended or adjusted under 35 U.S.C. 154(b) by 260 days.

(21) Appl. No.: 14/719,229

(22) Filed: May 21, 2015

(65) Prior Publication Data
US 2016/0238451 A1    Aug. 18, 2016

Related U.S. Application Data

(60) Provisional application No. 62/117,827, filed on Feb. 18, 2015.

(51) Int. Cl.
| | |
|---|---|
| H04N 5/33 | (2006.01) |
| G01J 5/00 | (2006.01) |
| B64C 19/00 | (2006.01) |
| G02F 1/01 | (2006.01) |
| G01J 5/10 | (2006.01) |
| G06T 7/00 | (2017.01) |
| G06T 7/11 | (2017.01) |
| G06T 7/136 | (2017.01) |

(52) U.S. Cl.
CPC .............. *G01J 5/0014* (2013.01); *G01J 5/10* (2013.01); *G06T 7/0004* (2013.01); *G06T 7/11* (2017.01); *G06T 7/136* (2017.01); *H04N 5/33* (2013.01); *G01J 2005/0048* (2013.01); *G01J 2005/0081* (2013.01); *G01J 2005/106* (2013.01); *G06T 2207/10048* (2013.01)

(58) Field of Classification Search
CPC ... G01J 5/00; B64C 19/00; G02F 1/01; H04N 5/33
See application file for complete search history.

(56) References Cited

U.S. PATENT DOCUMENTS

2014/0008526 A1    1/2014    Zeng et al.

*Primary Examiner* — Sath V Perungavoor
*Assistant Examiner* — Patricia I Young
(74) *Attorney, Agent, or Firm* — Robert E. Bushnell, Esq.

(57) ABSTRACT

An apparatus and method for validating a leak survey result obtained from an Optical Gas Imaging (OGI) device is proposed. The validation system is coupled to a gas detection infrared thermography camera that captures the infrared image of a scene which may or may not include a gas plume. The validation system performs operations to validate the leak survey result, which includes acquiring a background temperature of each pixel of the infrared image of the scene, acquiring a temperature of the gas plume or ambient air from a temperature sensor that is coupled to the validation system, calculating a temperature difference of said each pixel between the background temperature of said each pixel and the temperature of the gas plume or ambient air, comparing the temperature difference of said each pixel to a predetermined threshold value, and determining whether the leak survey result of the infrared thermography camera is valid based on the temperature difference of said each pixel.

17 Claims, 4 Drawing Sheets
(1 of 4 Drawing Sheet(s) Filed in Color)

(a)          (b)

(a)          (b)

(a)          (b)

APPARATUS AND METHOD FOR VALIDATING LEAK SURVEY RESULTS

CLAIM OF PRIORITY

This application claims priority under 35 U.S.C. §119 to Provisional Patent Application No. 62/117,827, entitled "APPARATUS AND METHOD FOR VALIDATING LEAK SURVEY RESULTS" filed on the 18th of February 2015, which application is incorporated herein by reference.

BACKGROUND OF THE INVENTION

Field of the Invention

This invention relates to an apparatus and a method to provide a quantitative metric to identify conditions that may cause a false negative finding in a leak survey using an infrared (IR) camera, and therefore determining if the leak survey conducted using the IR camera is invalid or valid.

Description of the Related Art

The U.S. Environmental Protection Agency (EPA) requires certain industrial facilities to routinely check for leaks of gases (or vapors) from process equipment such as valves, pumps, connectors, etc. (referred to as "components"). The EPA regulations that govern these leak checks are generally referred to as Leak Detection and Repair, or LDAR. The LDAR regulations require each component being leak checked one, twice or four times a year. The following discussion identifies and addresses the shortcomings that are intrinsic to the leak detection methods in current LDAR programs.

SUMMARY OF THE INVENTION

It is an object of the present invention to provide an apparatus and a method to provide a quantitative metric to identify conditions that may cause a false negative finding in a leak survey using an infrared camera.

In an embodiment, an optical gas imaging (OGI) leak survey system is proposed. The OGI leak survey system includes an infrared (IR) thermography camera capable of capturing an infrared image of a gas plume, a temperature sensor to measure a temperature of the gas plume or ambient air, and a validation system for validating the leak survey result obtained from the infrared image. The leak survey result is obtained from the infrared image of the gas plume. The validation system is coupled to the infrared thermography camera and coupled to the temperature sensor. The validation system includes a machine readable storage medium that provides instructions that cause a machine apparatus to perform operations to validate the leak survey result. The operations comprise steps of acquiring an apparent temperature of each pixel of the infrared image of a scene, acquiring a temperature of the gas plume or ambient air from the temperature sensor, calculating a temperature difference of said each pixel between the apparent temperature of said each pixel and the temperature of the gas plume or ambient air, comparing the temperature difference of said each pixel to a predetermined threshold value, and identifying areas in the scene where absolute values of the temperature difference are smaller than the predetermined threshold value and identifying the areas in the scene as unsuitable for an OGI leak survey and as the leak survey for these areas is invalid.

The infrared thermography camera is capable of measuring an apparent temperature for each pixel of the infrared image of the scene. The apparent temperature is a temperature calculated based on blackbody calibration and total infrared radiance received by the infrared thermography camera, including infrared energy emitted by a background, infrared energy reflected by the background and infrared energy transmitted through the background.

The step of said acquiring the temperature of the gas plume includes measuring an ambient temperature.

The step of said measuring the ambient temperature includes measuring an ambient temperature around the equipment being inspected for possible leak.

The temperature sensor may be attached to the infrared thermography camera.

The step of said determining whether the leak survey result of the infrared thermography camera is valid includes determining that the leak survey result is valid at a pixel if an absolute value of the temperature difference between the said pixel and the ambient air is no less than the predetermined threshold value.

In another embodiment, a validation system for validating a leak survey result obtained from an OGI infrared camera is proposed. The validation system is coupled to an infrared thermography camera that captures the infrared image of a scene. The validation system includes a machine readable storage medium that provides instructions that cause a machine apparatus to perform operations to validate the leak survey result. The operations comprise steps of acquiring a apparent temperature of each pixel of the infrared image of the scene, acquiring a temperature of the gas plume or ambient air from a temperature sensor that is coupled to the validation system, calculating a temperature difference of said each pixel between the apparent temperature of said each pixel and the temperature of the gas plume or ambient air, comparing the temperature difference of said each pixel to a predetermined threshold value, and identifying areas in the scene where absolute values of the temperature difference are smaller than the predetermined threshold value and identifying the areas in the scene as unsuitable for an OGI leak survey and as the leak survey for these areas is invalid.

The temperature of said each pixel of the infrared image of the scene is an apparent temperature of said each pixel. The apparent temperature of said each pixel is produced from the infrared thermography camera, the apparent temperature being a temperature calculated based on blackbody calibration and total infrared radiance received by the infrared thermography camera, including infrared energy emitted by a background, infrared energy reflected by the background and infrared energy transmitted through the background.

The temperature of the gas plume is an ambient temperature measured by the temperature sensor.

The step of said determining whether the leak survey result of the infrared thermography camera is valid includes determining that the leak survey result is valid at a pixel if an absolute value of the temperature difference of the pixel is no less than the threshold value.

In still another embodiment, a method for validating a leak survey result is proposed. The method comprises steps of capturing an infrared image of a scene from which the leak survey result is to be obtained, the infrared image being captured by an infrared camera system, acquiring an apparent temperature of each pixel of the infrared image of the scene, acquiring a temperature of the gas plume or ambient air, calculating a temperature difference of said each pixel between the apparent temperature of said each pixel and the temperature of the gas plume or ambient air, comparing the temperature difference of said each pixel to a predetermined threshold value, and identifying areas in the scene where absolute values of the temperature difference are smaller than the predetermined threshold value and identifying the areas in the scene as unsuitable for an OGI leak survey and as the leak survey for these areas is invalid.

The infrared camera system includes an infrared thermography camera that is capable of producing an apparent temperature for each pixel. The apparent temperature is a temperature calculated based on blackbody calibration and total infrared radiance received by the infrared thermography camera, including infrared energy emitted by a background, infrared energy reflected by the background, and infrared energy transmitted through the background.

The infrared image of the scene is captured by the infrared thermography camera.

The background temperature of said each pixel of the infrared image of the scene is an apparent temperature of said each pixel.

The step of said acquiring the temperature of the gas plume includes measuring an ambient temperature.

The step of said measuring the ambient temperature includes measuring an ambient temperature around the equipment being inspected for gas leak.

The step of said determining whether the leak survey result of the infrared camera system is valid includes determining that the leak survey result is valid at a pixel if an absolute value of the temperature difference of the pixel is no less than the threshold value.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE INVENTION

Figure 1:
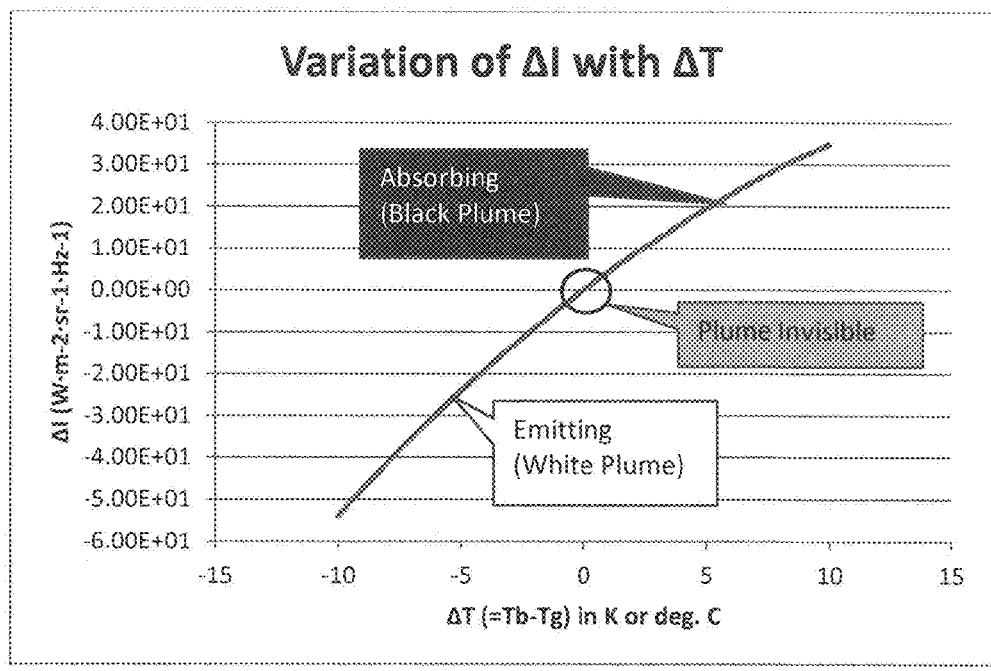
FIG. 1 shows a relationship between intensity difference ΔI and temperature difference ΔT for white plume and black plume.

As earlier mentioned herein, the U.S. Environmental Protection Agency (EPA) requires certain industrial facilities to routinely check for leaks of gases (or vapors) from process equipment such as valves, pumps, connectors, etc. (referred to as "components"). The EPA regulations that govern these leak checks are generally referred to as Leak Detection and Repair, or LDAR. The leak detection under the LDAR programs typically requires field technicians to use a portable instrument, commonly a flame ionization detector (FID) or a photo-ionization detector (PID), to individually "sniff" the components. Such leak survey procedures are prescribed in EPA Method 21 (Code of Federal Regulation, Title 40, Part 60, Appendix A, Method 21).

Surveying components for leaks using Method 21 is labor intensive, tedious, and prone to errors in measurement and record-keeping. A medium size petroleum refinery may have 250,000 components. The LDAR regulations require each component being leak checked one or four times a year, which translates to 250,000-1,000,000 leak checks per year, costing a single facility up to millions of dollars in annual operating expenses.

With the advent of optical gas imaging (OGI) technology, gas leaks can be detected by an OGI device, such as an Infrared (IR) camera with a narrow bandpass filter designed to image gas plumes that are otherwise invisible to the naked human eyes. Using an IR camera to detect leaks is also referred to as "Smart LDAR" because it is a more efficient method to find leaks. Industry worked with the U.S. EPA to adopt Smart LDAR as an alternative to Method 21 (Code of Federal Regulation, Title 40, Part 60, Appendix A, Method 21) for Leak Detection and Repair (LDAR) compliance purposes. In 2008, EPA promulgated a rule called Alternative Work Practice (AWP) allowing the use of IR camera for LDAR compliance. However, the AWP still requires industry to apply the conventional Method 21 at least once a year, i.e., the optical gas imaging (OGI) method cannot completely replace Method 21. The requirement to maintain both Method 21 and the AWP effectively eliminates the potential cost savings offered by the AWP. As a result, the AWP has not been widely used by industry for LDAR compliance.

There are several reasons that the EPA has not given facilities an option to use OGI as the sole method for leak detection. One of the most critical reasons is that until recently OGI has been a qualitative method.

Another important factor for EPA's reluctance to allow the use of OGI as the sole method for leak detection is the uncertainty associated with the IR camera's ability to detect leaks under certain environmental conditions. Due to the nature of the passive infrared (IR) optical gas imaging (OGI) technology, the operator may see a leak under one set of environmental conditions but may not see the leak under another set of environmental conditions. It is qualitatively known that the ambient temperature and the background temperature can be the primary factors determining the operator's ability to detect the leak using an IR camera, but these conditions have not been well characterized leading to some uncertainty regarding the OGI's ability to detect leaks. There is no established method to determine if a given set of environmental conditions may cause a false negative result for an OGI leak survey. As a result, environmental regulating authorities are reluctant to allow industry to completely rely on OGI technology to detect leaks. If a quantitative method is developed to determine the conditions which can result in a false negative, it will greatly alleviate this concern. Combining such a method with the newly developed QOGI should set the stage for further adoption of OGI beyond the promulgated AWP, which will provide industry with the ability to use OGI as the primary technology for LDAR compliance and realize the environmental benefits at a lower cost.

The present invention will now be described with reference to the accompanying drawings, in which an exemplary embodiment of the invention is shown.

The method described in this application provides a quantitative metric to identify conditions that may cause a false negative finding in a leak survey using an IR camera system, and therefore determining if the leak survey conducted using the IR camera system is invalid or valid. Herein the IR camera system may include an IR camera and any validation hardware and software (to be further described below). The method described in this application provides a quantitative metric to determine whether the leak survey results obtained from the IR camera system is valid or inconclusive. If a leak survey result obtained from the IR camera system is determined as inconclusive, this leak survey result may not be reliable and the leak survey should be re-performed under different environmental conditions or a different method needs to be employed to obtain reliable leak survey results.

Under the right conditions, the existence of a gas plume between the IR camera and the background will cause a change in the IR intensity received at individual pixels of the IR camera sensor. This change of IR intensity, $\Delta I$, is a function of the IR absorption coefficient ($\alpha$) of the gas, the concentration (C) of the gas in the gas column between the IR camera and the background objects and represented by a pixel, the path length (L) of the gas column, and the temperature difference ($\Delta T$) between the temperatures of the gas plume and the background. For a given IR camera and a given gas (i.e., given absorption coefficient ($\alpha$) and given values of the concentration (C) and the path length L), the primary factor which affects the IR camera's ability to detect a leak is $\Delta T$ (i.e., the difference in temperature between the gas plume and the background). The relationship between $\Delta I$ and $\Delta T$ is illustrated in FIG. 1.

When the temperature of the gas plume Tg is lower than the temperature of the background Tb (Tg<Tb, and $\Delta T$=Tb−Tg>0), the gas is absorbing more IR energy than it is emitting and the plume appears in the IR camera as dark plume (Black Plume in FIG. 1). When the gas plume temperature Tg is higher than the background temperature Tb (Tg>Tb, and $\Delta T$<0), the gas is emitting more IR energy than it is absorbing and the plume appears in the IR camera as white plume (White Plume in FIG. 1). When the temperature of the gas plume Tg is same as the temperature of the background Tb (Tg=Tb, and $\Delta T$=0), the gas is absorbing as much IR energy as it is emitting; the net effect is no IR intensity change ($\Delta I$=0); no contrast between the background pixels and the gas plume pixels; and therefore the gas plume is invisible in the IR camera. When $\Delta T$=0, the gas leak is not detectable regardless of the IR spectrum of the gas compound ($\alpha$) or leak rate (resulting concentration C and path length L). Therefore, $\Delta T$=0 is the condition that renders OGI technology unacceptable for LDAR compliance purposes.

The above discussion is valid for what is called "apparent temperature" in the field of IR thermography. The apparent temperature is the temperature calculated based on blackbody calibration and the total IR radiance received by the IR camera, including the IR energy emitted by the background object (the emissive component), the IR energy reflected by the background (the reflective component), and IR energy transmitted through the background (the transmission component). In the field of thermography, care must be taken to subtract the reflective component and the transmission component from the total IR radiance, leaving only the emissive component that corresponds to the true temperature of the object of the measurement.

However, in OGI applications, all three components will contribute to the formation of the gas image and therefore there is no need to break down these components. Simply the sum of the IR energy will be used, which is described as the apparent temperature (as opposed to the actual temperature of the background object). In the present invention, the apparent temperature acquired from the OGI device can be used for the background temperature Tb.

An infrared (IR) thermography camera is radiometrically calibrated with a blackbody to establish a definitive relationship between the IR intensity received by the IR camera sensor and the temperature of the blackbody. With such a radiometrically calibrated IR camera (hereafter referred to as thermography IR camera or simply IR camera), the apparent temperature of each part of a background object (Tb) in the scene can be measured by the pixel that represents the background object. The IR thermography cameras are commercially available, and the apparent temperature of an object can be directly obtained from the IR thermography camera.

If the ambient temperature is also independently measured by another sensor (e.g., a typical mercury-in-glass thermometer, resistance thermometer, etc.), this ambient temperature can be used to represent the temperature of the gas plume (Tg). It can be assumed that the temperature of the gas plume is the same as the ambient temperature because in the typical leak detection scenario, the gas plume has a relatively small volume and quickly equilibrates with the surrounding ambient air.

With the apparent temperature (Tb) measured for each pixel of the IR thermography camera and the temperature of the gas plume (Tg) measured for the entire scene, a temperature difference $\Delta T$ (=Tb−Tg) can be determined for every pixel of the IR thermography camera in a particular scene. If $\Delta T$=0 in certain areas in the scene, the leak survey using the IR thermography camera is inconclusive in these areas. Conversely, the rest of the areas in the scene should have $\Delta T$>0 or $\Delta T$<0, and the leak survey using the IR thermography camera is conclusive and valid.

The above discussion is based on a simplified theoretic evaluation. In practice, the threshold for an IR camera to detect leak will not be a single value of $\Delta T$=0 because the IR energy balance in and out of the gas plume may not be precise and the measurement of the temperatures Tb and Tg contains some errors. With consideration of some tolerance for noises, a threshold value (Tt) greater than zero (e.g., Tt=2° C.) can be used to declare whether or not the leak survey performed by the IR camera is conclusive or valid. If the absolute value of the temperature difference $\Delta T$ is greater than the threshold value Tt (i.e., $|\Delta T|$>Tt) for certain areas in the scene, the leak survey for these areas is valid. Conversely, the leak survey in the areas with $|\Delta T| \leq Tt$ is not valid.

Figure 2:
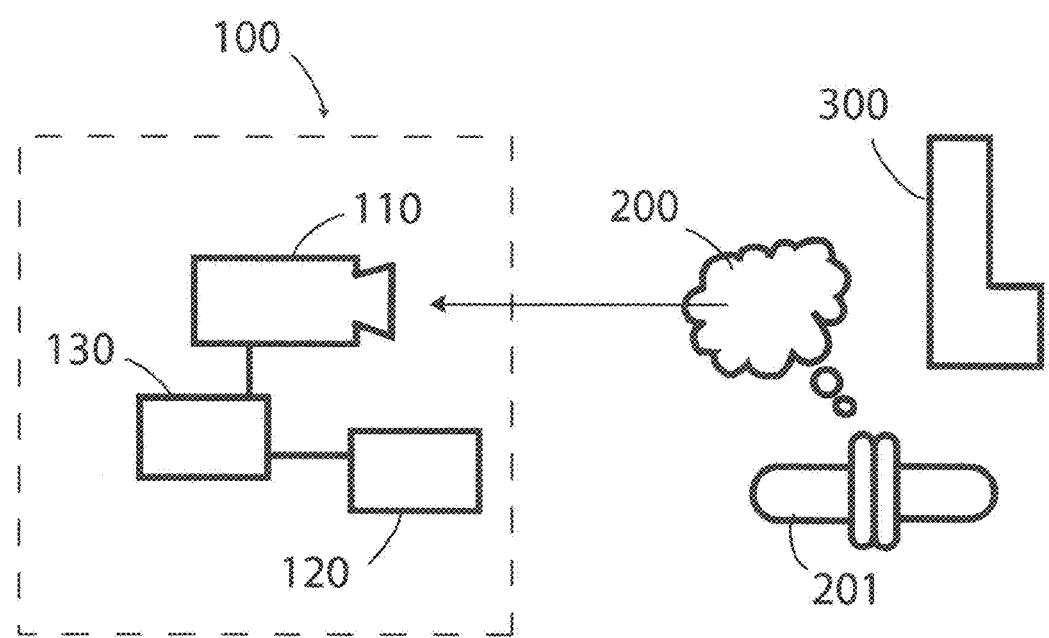
FIG. 2 shows an optical gas imaging (OGI) leak survey system constructed as an embodiment of the present invention.

In one embodiment of the present invention, an OGI leak survey system including a leak survey validation system is proposed. Referring to FIG. 2, the IR imaging leak survey system 100 of the embodiment includes an infrared (IR) imaging system 110 to capture images of gas plume, a temperature sensor 120 for the measurement of ambient temperature (to represent the temperature of the gas plume if gas a plume is in the scene), and an analyzer 130 that includes a validation system or validation module to collect data from the IR imaging system and the temperature sensor 120 and to verify whether the leak survey results from the IR imaging leak survey system 100 is valid. Gas plume 200 is produced or leaked from a piece of equipment 201 (also referred to as "component" in the LDAR terminology), and the IR imaging leak survey system 100 is directed to capture and analyze the images of the gas plume 200. The validation module can be referred to as the leak survey validation system. The reference numeral 300 indicates a background that represents all background objects in the scene, which may include equipment being inspected for leak. Though in FIG. 2 the equipment 201 inspected for leak is seen as separated, the equipment 201 can be included in the background.

The IR imaging system 110 and the temperature sensor 120 are coupled to the analyzer 130 for data communications. Depending on applications, the analyzer 130 can be integrated in the IR imaging system 110 or stand alone. For example, the analyzer 130 can communicate with the IR imaging system 110 wirelessly or by wires. The temperature sensor 120 for the measurement of the temperature of the gas plume can be attached to the IR imaging system 110 or stand alone. The temperature sensor 120 can communicate with the analyzer 130 wirelessly or by wires. Alternatively, temperature measured by the sensor 120 can be manually entered into the analyzer 130 by operator.

The IR imaging system 110 can be an infrared (IR) camera. In this case, the IR camera 110 must be designed for gas detection, and radiometrically calibrated to measure apparent temperature of objects in the scene at the pixel level. For example, the IR camera 110 can be an infrared (IR) thermography camera that is radiometrically calibrated with a blackbody to establish a definitive relationship between the IR intensity received by the IR camera sensor and the temperature of the blackbody. The IR camera 110 must be designed for gas detection. The gas detection capability is typically achieved through spectral filtering, e.g. a narrow bandpass filter that overlaps with an absorption band of the IR spectrum of the target gas or gases. A narrow bandpass filter with a spectral window in Mid-Wave Infrared (MWIR) near 3.2-3.4 micrometer ($\mu$) can generally detect a large number of hydrocarbons such as alkanes (methane, ethane, propane, etc.), alkenes (ethylene, propylene, etc.), cycloalkanes (cyclohexane, etc.), aromatics (benzene, ethylbenzene, toluene, etc.), oxygenated hydrocarbon (methanol, etc.), and other chemicals that have similar hydrocarbon functional groups. A narrow bandpass filter or a multispectral imager in Long-Wave Infrared (LWIR) can also detect these chemicals.

The IR imaging system 110, however, is not limited to the IR cameras. The IR imaging system 110 can include any system for imaging gas plume, which includes the IR thermography camera. For example, the IR imaging system 110 can include a leak quantification system that is designed to measure a leak rate of gas plume.

The temperature sensor 120 for the measurement of the temperature of the gas plume, which can be represented by ambient air temperature, can be a thermometer or any temperature sensor. For the purpose of validating gas leak survey, whether or not there is a gas plume has not been determined. Therefore, the operator cannot perform a measurement of the gas plume temperature. Instead, an ambient temperature will be measured to represent the gas plume temperature Tg if the gas plume exists. The ambient temperature may be measured around the IR imaging leak survey system 100 or around the equipment 201 to be checked for gas leak. As described above, it can be assumed that the temperature of the gas plume is the same as the ambient temperature because in a typical leak detection scenario, the gas plume has a relatively small volume and quickly equilibrates with the surrounding ambient air.

The temperature sensor 120 should be capable of measuring true ambient temperature (as opposed to an apparent temperature). An IR based thermometer is unlikely suitable for this ambient temperature measurement. Caution should be exercised for a temperature sensor that is based on heat loss/heat balance (e.g., resistance temperature detector (RTD) temperature sensor) to minimize the effect of wind at the sensor. The temperature sensor such as a mercury-in-glass thermometer could be suitable for this application. Regardless of type of temperature sensors, the ambient temperature should be measured without direct sunlight on the sensor.

The analyzer 130 includes a validation module that can be an electronic storage device that can store the pixel map of the background temperature Tb measured by the IR imaging system 110, store the temperature of the gas plume Tg (i.e., ambient temperature) measured by the temperature sensor 120, calculate the temperature difference $\Delta T$ ($=Tb-Tg$) at each pixel of the IR camera 110, store the results of comparisons between the temperature difference $\Delta T$ and a predetermined threshold value Tt for each pixel of the IR imaging system 110, optionally store procedures to cluster pixels based on whether or not the absolute temperature difference ($|\Delta T|$) is greater than the threshold value Tt, and present the results through a user interface. The background temperature Tb can be obtained from a single frame. If the IR imaging system 110 is stabilized physically or through an image stabilization algorithm, the background temperature Tb can be averaged or otherwise statistically processed based on measurements over multiple frames to obtain the values of Tb that are more representative of the background. The threshold value Tt is predetermined, and can be stored in the validation module. The threshold value Tt is not fixed at a value, but can be changed by a user depending on applications or the required accuracy of the leak survey.

In another embodiment, a validation system for validating a leak survey result obtained from an infrared image of a gas plume is proposed. This validation system can be coupled or employed to other leak survey system that performs the leak survey of a gas plume. For example, the validation system can be coupled to an infrared thermography camera that captures the infrared image of the gas plume. The validation system can be employed in the analyzer 130 as a form of a validation module, such as an integrated chip (IC), memory or hard disk, and includes instructions that cause a machine apparatus to perform operations to validate the leak survey result.

These operations of the validation system includes steps of acquiring a background temperature of each pixel of the infrared image of the gas plume, acquiring ambient temperature from a temperature sensor that is coupled to the validation system, calculating a temperature difference of said each pixel between the background temperature of said each pixel and the ambient temperature, comparing the temperature difference of said each pixel to a predetermined threshold value, and determining whether the leak survey result of the infrared thermography camera is valid based on the temperature difference of said each pixel.

The validation system can be coupled to, for example, an infrared thermography camera, which captures an image of a gas plume, to obtain apparent temperature at each pixel. The validation system may set this apparent temperature of each pixel as the background temperature of each pixel. The validation system can be coupled to a temperature sensor to an ambient temperature measured by the temperature sensor. The validation system may determine that the leak survey result is valid at a pixel if an absolute value of the temperature difference of the pixel is no less than the threshold value.

Figure 3:
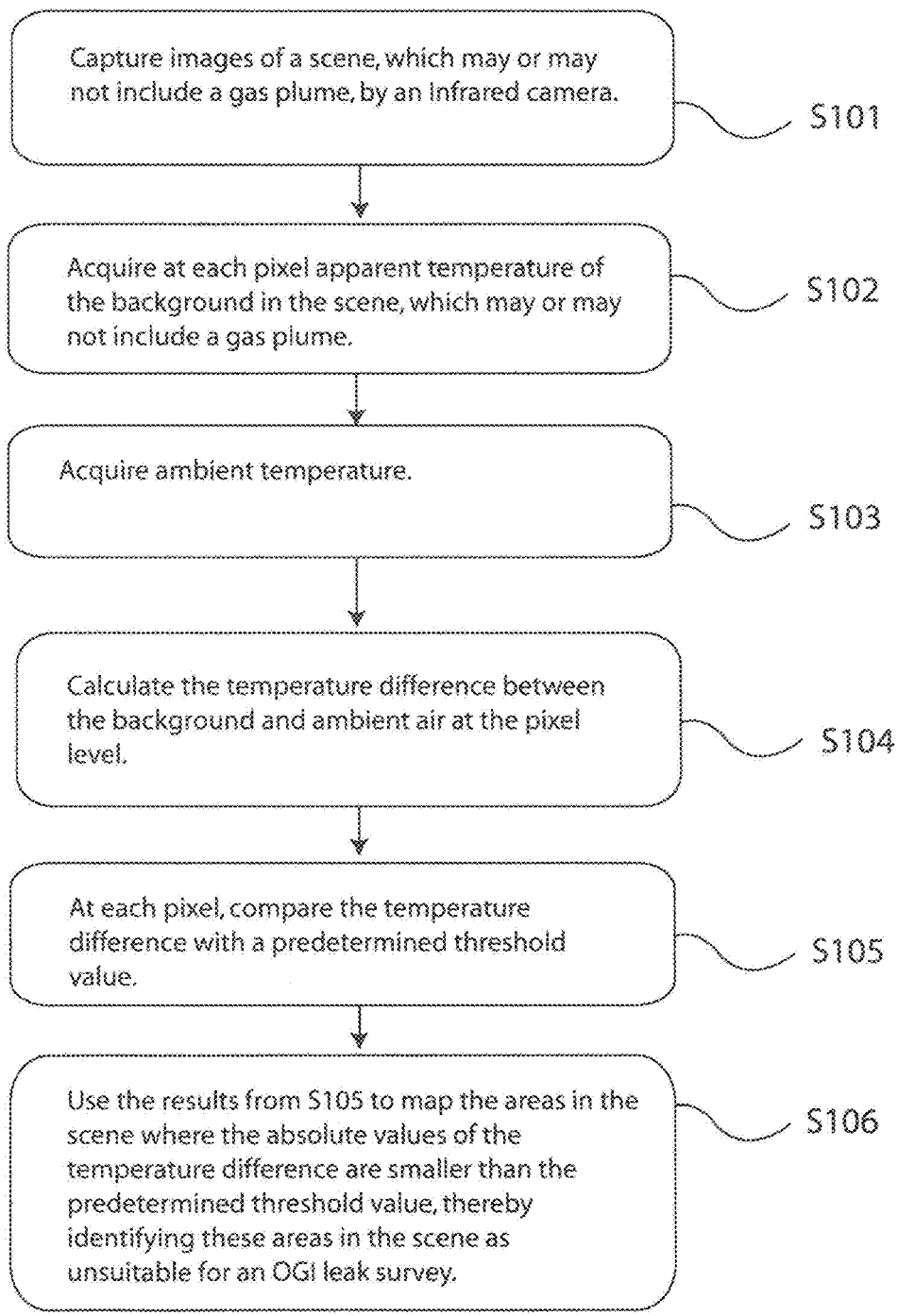
FIG. 3 shows a flowchart for performing leak survey validation.

In still another embodiment, a method for a leak survey validation is proposed. FIG. 3 shows a flowchart that illustrates the processes of validating the leak survey result. Referring to FIG. 3, images of a scene, which may or may not include a gas plume, are captured by an Infrared camera (S101). The objects in the scene include background objects 300, which also include equipment 201, shown in FIG. 2, from which the gas plume 200 may be produced. The IR imaging system 110 may include an IR thermography camera that produces an apparent temperature for each pixel of the scene, which may include the image of the gas plume. Pixel-by-pixel apparent temperature of the background in the scene, which may or may not include a gas plume are acquired (S102). In this case, the back ground temperature for a pixel is the apparent temperature for the pixel produced from the IR imaging system 110. An ambient temperature is acquired (S103). As described above, if there is a gas leak, the temperature of the gas plume 200 can be directly measured by the temperature sensor 120, or an ambient temperature can be used for the temperature of the gas plume 200. The temperature difference between the background and ambient air at the pixel level is calculated (S104). At the pixel level, the temperature difference with a predetermined threshold value is compared (S105). The results from the step S105 to map the areas in the scene where the absolute values of the temperature difference are smaller than the predetermined threshold value are used, thereby identifying these areas in the scene as unsuitable for an OGI leak survey (S106). A leak survey should be re-performed for these areas when the environmental conditions are different. The leak survey is valid for the areas where the absolute values of the temperature difference are greater than the predetermined threshold value.

Figure 4:
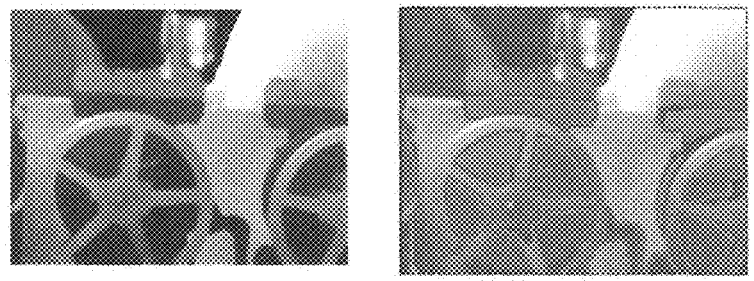
FIGS. 4, 5 and 6 show illustrations of the validation results from an OGI leak survey.
Figure 5:
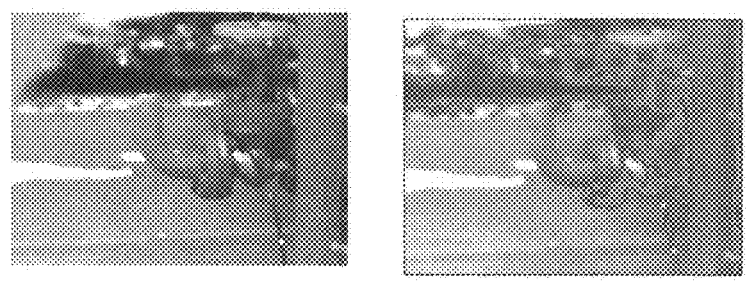
Figure 6:
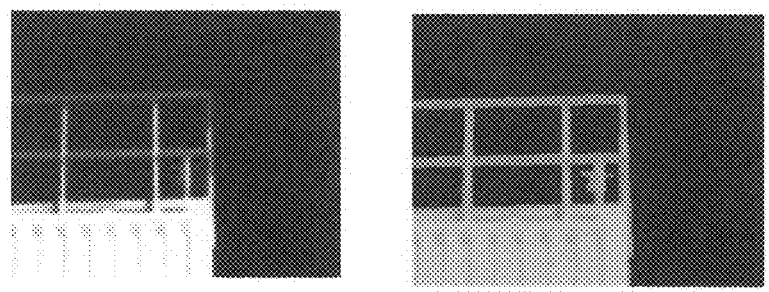

A colorized overlay, as shown in FIGS. 4, 5 and 6 on the infrared image produced by the OGI device can illustrate to the user the regions in the field of view where the leak survey is valid (no overlay, for example) and the regions where the leak survey is not valid (red overlay, for example).

FIGS. 4, 5 and 6 show exemplary results illustrating how the leak survey validation method can be applied to determine whether the temperature difference is sufficient to image gas plumes, and therefore whether the leak survey conducted under such a condition will be valid. The images shown in FIGS. 4(*a*), 5(*a*) and 6(*a*) are original infrared (IR) images of the scenes obtained from an IR thermography camera. FIGS. 4(*b*), 5(*b*) and 6(*b*) are the same images with areas where |$\Delta T$|<threshold colorized in red overlay, illustrating that the leak survey in these areas is not valid. The remainder of the areas (non-colorized areas) are suitable for gas imaging under this condition, and the leak survey for these non-colorized areas will be conclusive and therefore the results will be valid. In FIGS. 4 and 5, areas with red color overlay have $\Delta T$<threshold. In FIG. 6, areas with red color overlay have negative $\Delta T$. However, the absolute value of $\Delta T$, |$\Delta T$|, is smaller than the threshold and the results in these areas are also invalid.

Depending on the configuration and mode of the validation module, the validation method can be applied in real-time with the IR camera leak survey, or can be applied while post-processing the video images captured by the IR camera, provided that the contemporaneous ambient temperature data is captured and stored.

When the method described in this invention is applied to a series of frames in a leak survey video, the method can be used to recognize and colorize a gas plume in the video. In this application of the method, the presence of a gas plume will cause changes in $\Delta T$ for the image pixels that cover the gas plume. From the center to the edge of the plume, there will be a concentration gradient, which will cause |$\Delta T$| transitioning from less than to greater than a threshold or vice versa. As a result, portions of the gas plume represented by pixels that have |$\Delta T$|<the threshold will be colorized by this method. Due to plume dynamics in the open air, the colorized plume will create a motion, which can be recognized as a gas plume by human operators or machine vision algorithms.

While this invention has been described in connection with what is presently considered to be practical exemplary embodiments, it is to be understood that the invention is not limited to the disclosed embodiments, but is intended to cover various modifications and equivalent arrangements included within the scope of the claims.

What is claimed is:

1. An optical gas imaging (OGI) leak survey system, comprising:

an infrared (IR) thermography camera capable of capturing an infrared image of a gas plume, a leak survey result being obtained from the infrared image of the gas plume;

a temperature sensor to measure a temperature of the gas plume or ambient air; and a validation system for validating the leak survey result obtained from the infrared image, the validation system coupled to the infrared thermography camera and coupled to the temperature sensor, the validation system including a machine readable storage medium that provides instructions that cause a machine apparatus to perform operations to validate the leak survey result, the operations comprising:

acquiring an apparent temperature of each pixel of the infrared image of a scene;

acquiring a temperature of the gas plume or ambient air from the temperature sensor;

calculating a temperature difference of said each pixel between the apparent temperature of said each pixel and the temperature of the gas plume or ambient air;

comparing the temperature difference of said each pixel to a predetermined threshold value; and identifying areas in the scene where absolute values of the temperature difference are smaller than the predetermined threshold value, and identifying the areas in the scene as unsuitable for an OGI leak survey and as the leak survey for these areas is invalid.

2. The OGI leak survey system of the claim 1, comprised of the infrared thermography camera capable of measuring an apparent temperature for each pixel of the infrared image of the scene, the apparent temperature being a temperature calculated based on blackbody calibration and total infrared radiance received by the infrared thermography camera, including infrared energy emitted by a background, infrared energy reflected by the background and infrared energy transmitted through the background.

3. The OGI leak survey system of the claim 1, comprised of said acquiring the temperature of the gas plume including measuring an ambient temperature.

4. The OGI leak survey system of the claim 3, comprised of said measuring the ambient temperature including measuring an ambient temperature around the equipment being inspected for possible leak.

5. The OGI leak survey system of the claim 1, comprised of the temperature sensor being attached to the infrared thermography camera.

6. The OGI leak survey system of the claim 1, comprised of said determining whether the leak survey result of the infrared thermography camera is valid including determining that the leak survey result is valid at a pixel if an absolute value of the temperature difference between the said pixel and the ambient air is no less than the predetermined threshold value.

7. A validation system for validating a leak survey result obtained from an OGI infrared camera, the validation system coupled to an infrared thermography camera that captures the infrared image of a scene, the validation system including a machine readable storage medium that provides instructions that cause a machine apparatus to perform operations to validate the leak survey result, the operations comprising:
- acquiring an apparent temperature of each pixel of the infrared image of the scene;
- acquiring a temperature of the gas plume or ambient air from a temperature sensor that is coupled to the validation system;
- calculating a temperature difference of said each pixel between the apparent temperature of said each pixel and the temperature of the gas plume or ambient air;
- comparing the temperature difference of said each pixel to a predetermined threshold value; and
- identifying areas in the scene where absolute values of the temperature difference are smaller than the predetermined threshold value, and identifying the areas in the scene as unsuitable for an OGI leak survey and as the leak survey for these areas is invalid.

8. The validation system of the claim 7, comprised of the temperature of said each pixel of the infrared image of the scene being an apparent temperature of said each pixel, the apparent temperature of said each pixel being produced from the infrared thermography camera, the apparent temperature being a temperature calculated based on blackbody calibration and total infrared radiance received by the infrared thermography camera, including infrared energy emitted by a background, infrared energy reflected by the background and infrared energy transmitted through the background.

9. The validation system of the claim 7, comprised of the temperature of the gas plume being an ambient temperature measured by the temperature sensor.

10. The validation system of the claim 7, comprised of said determining whether the leak survey result of the infrared thermography camera is valid including determining that the leak survey result is valid at a pixel if an absolute value of the temperature difference of the pixel is no less than the threshold value.

11. A method for validating a leak survey result, the method comprising:
- capturing an infrared image of a scene from which the leak survey result is to be obtained, the infrared image being captured by an infrared camera system;
- acquiring an apparent temperature of each pixel of the infrared image of the scene;
- acquiring a temperature of the gas plume or ambient air;
- calculating a temperature difference of said each pixel between the apparent temperature of said each pixel and the temperature of the gas plume or ambient air;
- comparing the temperature difference of said each pixel to a predetermined threshold value; and
- identifying areas in the scene where absolute values of the temperature difference are smaller than the predetermined threshold value, and identifying the areas in the scene as unsuitable for an OGI leak survey and as the leak survey for these areas is invalid.

12. The method of the claim 11, comprised of the infrared camera system including an infrared thermography camera that is capable of producing an apparent temperature for each pixel, the apparent temperature being a temperature calculated based on blackbody calibration and total infrared radiance received by the infrared thermography camera, including infrared energy emitted by a background, infrared energy reflected by the background, and infrared energy transmitted through the background.

13. The method of the claim 12, comprised of the infrared image of the scene being captured by the infrared thermography camera.

14. The method of the claim 11, comprised of the background temperature of said each pixel of the infrared image of the scene being an apparent temperature of said each pixel.

15. The method of the claim 11, comprised of said acquiring the temperature of the gas plume including measuring an ambient temperature.

16. The method of the claim 15, comprised of said measuring the ambient temperature including measuring an ambient temperature around the equipment being inspected for gas leak.

17. The method of the claim 11, comprised of said determining whether the leak survey result of the infrared camera system is valid including determining that the leak survey result is valid at a pixel if an absolute value of the temperature difference of the pixel is no less than the threshold value.

* * * * *